May 20, 1941.  J. B. ARMITAGE  2,242,445

MACHINE TOOL TRANSMISSION AND CONTROL MECHANISM

Original Filed Feb. 19, 1937   3 Sheets-Sheet 1

INVENTOR
JOSEPH B. ARMITAGE
BY W. D. O'Connor
ATTORNEY

May 20, 1941.  J. B. ARMITAGE  2,242,445

MACHINE TOOL TRANSMISSION AND CONTROL MECHANISM

Original Filed Feb. 19, 1937  3 Sheets-Sheet 2

INVENTOR
JOSEPH B. ARMITAGE
BY *W. D. O'Connor*
ATTORNEY

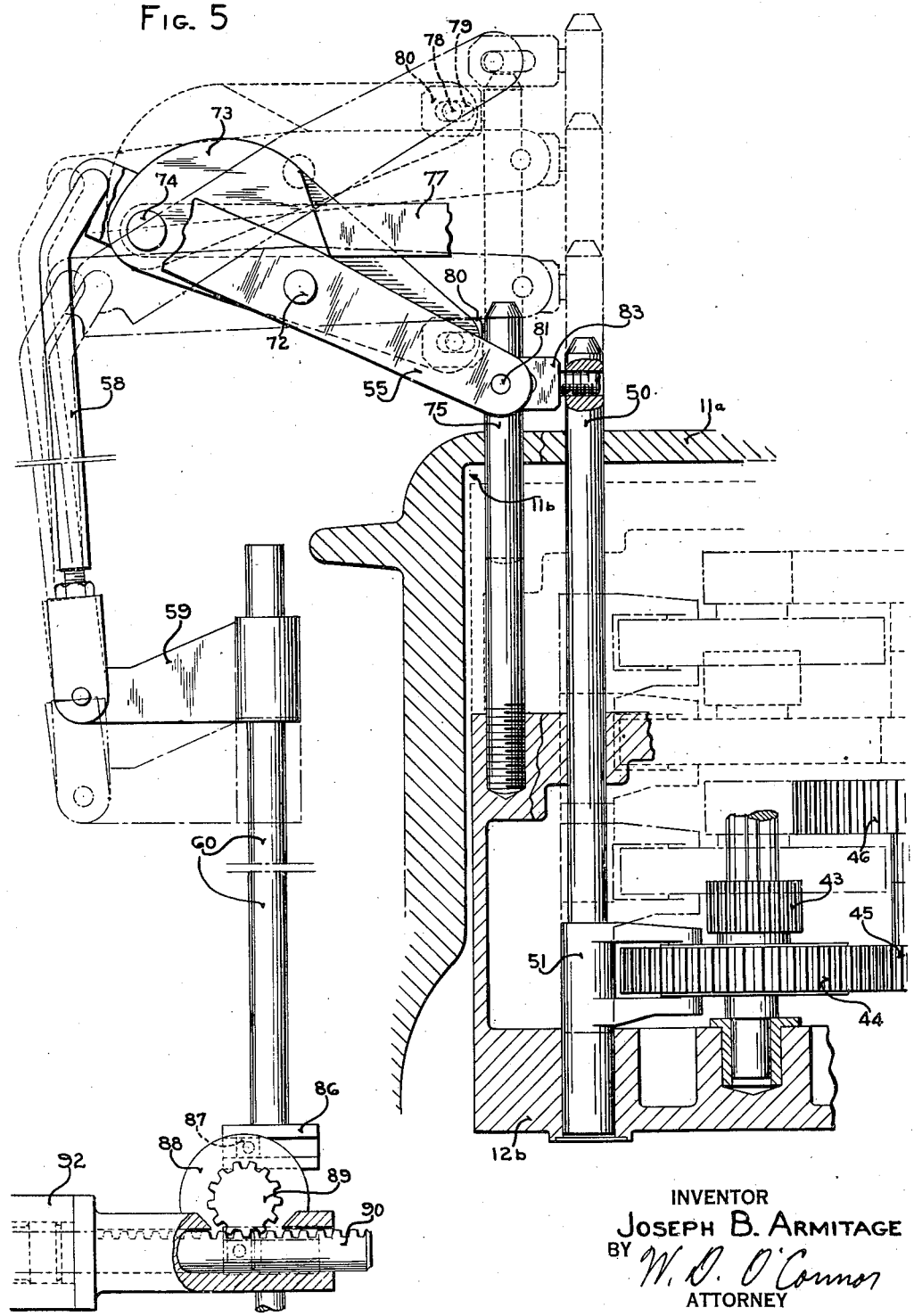

Patented May 20, 1941

2,242,445

UNITED STATES PATENT OFFICE 2,242,445

MACHINE TOOL TRANSMISSION AND CONTROL MECHANISM

Joseph B. Armitage, Wauwatosa, Wis., assignor to Kearney & Trecker Corporation, West Allis, Wis., a corporation of Wisconsin Application February 19, 1937, Serial No. 126,597
Renewed January 4, 1940

29 Claims. (Cl. 90—16)

This invention relates, generally, to control mechanism for machine tools, and more particularly to mechanism for effecting control of apparatus carried by a movable part of a machine by means of an actuating device supported on a stationary part of the machine.

In some machine tools, for example in a milling machine of the vertical-spindle, sliding-head type having speed-changing transmission apparatus for rotating the spindle at selected speeds, it is desirable that the transmission apparatus be divided into several independent speed-changing mechanisms arranged in series relation and that one of the mechanisms of the series be carried by the sliding head. It is further desirable that a single speed-changing control element, preferably mounted on the column of the machine, be arranged to actuate all of the speed-changing mechanisms cooperatively, in order to conveniently establish any desired rate of speed for the spindle. A vertical spindle milling machine having a speed-changing control element mounted on the column and arranged in this manner to shift gearing in the sliding head, is disclosed and broadly claimed in my Patent No. 1,957,310, issued May 1, 1934 and entitled Machine tool transmission and control.

It is a general object of the present invention to provide improved control mechanism adapted for operation from one part of a machine to effect control of apparatus on another relatively movable part of the machine.

Another object of the invention is to provide an improved compensating mechanism for a gear-shifting apparatus, that is adapted to maintain the gear-engaging part of the apparatus in predetermined operative relationship with the gears to be shifted while the gears and their supporting elements are being moved bodily relative to the gear-controlling part of the apparatus.

Another object is to provide a milling machine of the vertical-spindle, sliding-head type having improved and simplified compensating mechanism associated with the gear shifting apparatus thereof and operative to maintain constant relationship between shifting apparatus in the column of the machine and shiftable gearing in the sliding head at any position of the sliding head.

A further object of the invention is to provide an equalizing linkage for operatively associating apparatus in relatively movable parts of a machine, the linkage being adapted to maintain a predetermined operating relationship between the apparatus in one part of the machine and other apparatus in another relatively movable part thereof in any position assumed by the movable part.

A further object of the invention is to provide improved means for aligning and connecting relatively movable parts of a machine tool.

A still further object of the invention is to provide an improved lubricant guard or retaining means for use with sliding shafts in a machine tool.

According to this invention, as exemplified by a preferred embodiment thereof in a milling machine of the vertical-spindle, sliding-head type having speed-changing gearing part of which is mounted in the sliding head, improved means are provided for effecting shifting of the speed changing gearing in the sliding head by mechanism mounted in the column of the machine. In order that movement of the sliding head relative to the column may not alter the adjustment of the speed changing gearing in the head, compensating mechanism in the form of mechanical linkage is arranged in the shifting means to maintain the operative connection with the shiftable gearing substantially the same for any position of the sliding head. In a particular preferred construction, the gear shifting mechanism includes a shifting lever operatively connected at one of its ends to the gears to be shifted in the head, and at its other end to the shifting device in the column. The shifting lever is pivotally mounted on a movable fulcrum supported by an equalizing lever that is in turn pivotally mounted in the column at one end and operatively connected to the sliding head at the other end, the arrangement being such that the equalizing lever moves the supporting fulcrum of the shifting lever in manner to maintain the shifting lever in substantially constant operating relationship with the gearing in the sliding head in any position assumed by the head relative to the column.

The foregoing and other objects of the invention, which will become more fully apparent from the following detailed description of mechanism exemplifying a preferred embodiment thereof, may be achieved by the particular apparatus herein described in connection with the illustration thereof in the accompanying drawings, in which:

Fig. 5 is a diagrammatic, somewhat expanded, view generally similar to Fig. 2 and showing the positions assumed by the shifting linkage for various positions of the sliding head and of the gear-changing mechanism;

Fig. 6 is an enlarged detailed view of the lower part of the elevating screw seen in Fig. 4, showing adjustable means for attaching the screw to the head; and Fig. 7 is another view of the elevating screw attaching means taken on the plane represented by the line 7—7 in Fig. 6.

Figure 1:
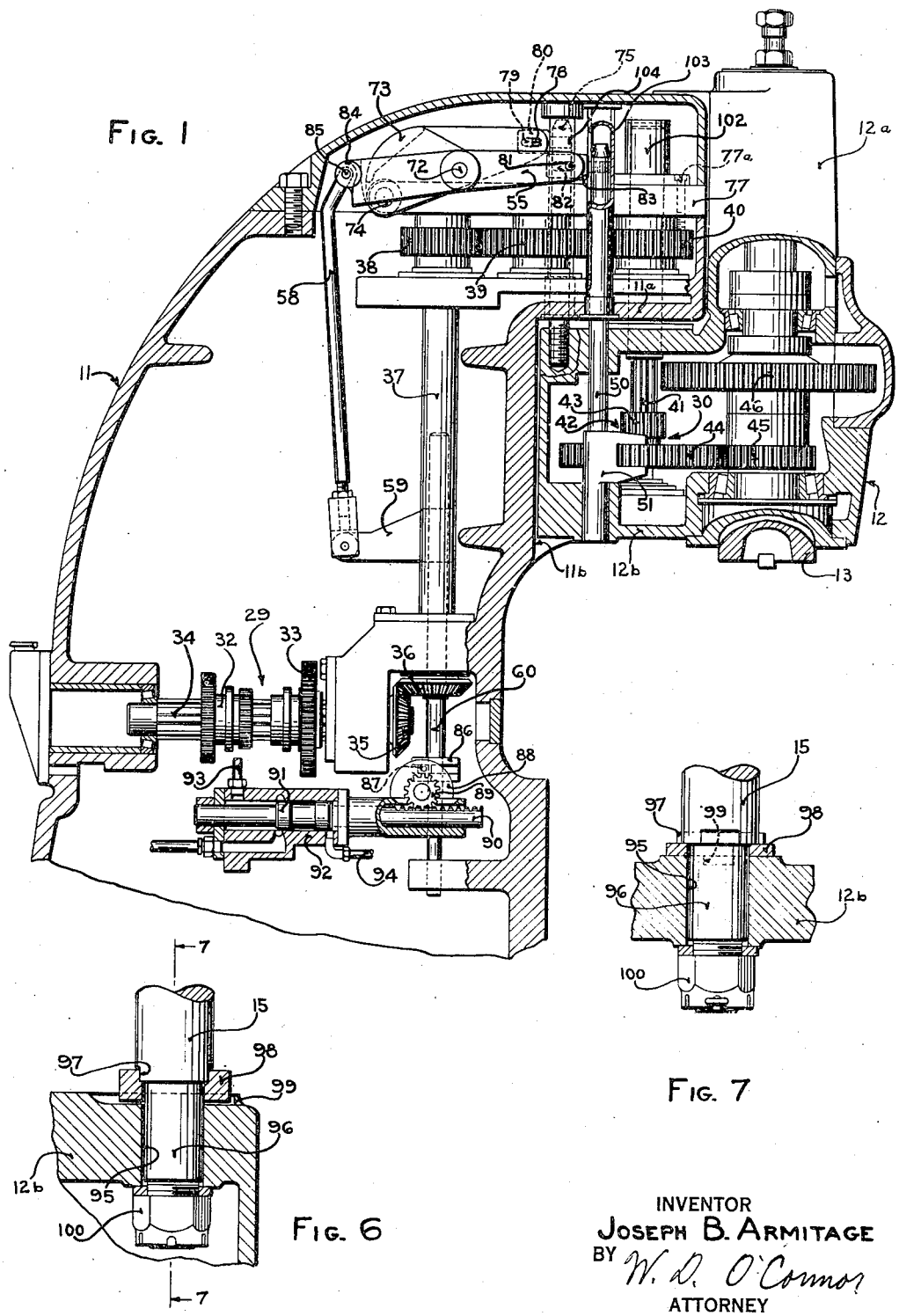
Figure 1 is a view, largely in vertical section, of the upper part of a milling machine of the vertical-spindle, sliding-head type embodying the novel gear shifting mechanism of this invention, part of the sliding head of the machine being shown in left side elevation.

The particular machine tool illustrated as exemplifying apparatus disclosing a preferred embodiment of the several features of the present invention, is a milling machine of the vertical-spindle, sliding-head type, the upper portion only of the machine being shown in the drawings since the other parts thereof are not directly concerned with this invention.

Referring more specifically to the drawings, and particularly to Fig. 1, the milling machine there disclosed comprises in general an upstanding column 11 that carries at its upper forwardly projecting end 11a a vertically slidable hollow head or spindle carrier 12, in which is journaled a vertically disposed tool spindle 13. As shown, the spindle supporting head 12 includes a spindle-carrying portion 12a extending upwardly along the forward upper end 11a of the column, and a gear-carrying lower portion 12b extending rearwardly into a recess 11b beneath the forwardly projecting upper part 11a of the column.

Figure 2:
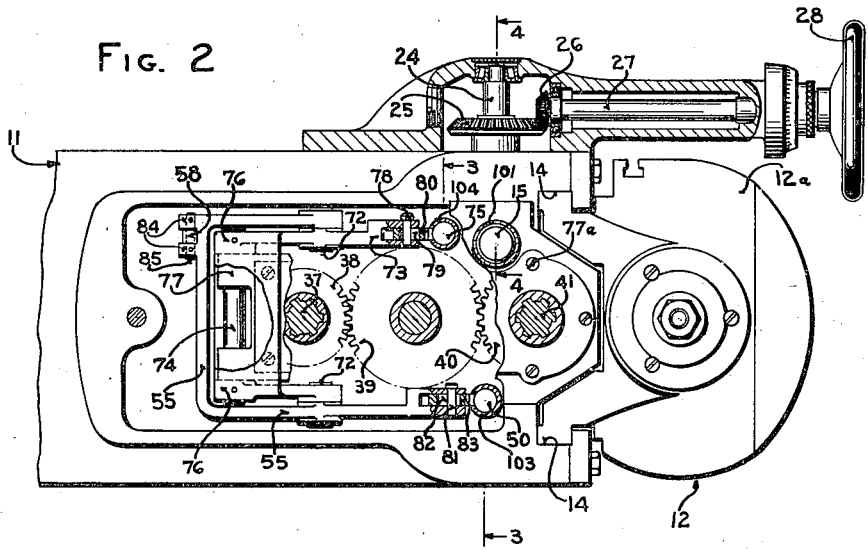
Fig. 2 is a plan view of the upper part of the machine shown with the top cover removed and with the head elevating mechanism in horizontal section taken substantially on the planes represented by the line 2—2 in Fig. 4.

As may best be seen in the top view, Fig. 2, the sliding head 12 is mounted in vertical guideways 14 on the forward face of the upper part 11a of the column 11 in manner to permit vertical sliding movement of the head bodily relative to the column. For moving the head vertically, there is provided a screw and nut elevating or feeding mechanism, best shown in Fig. 4, that includes a threaded rod or feed screw 15 secured to the gear-carrying lower part 12b of the sliding head underlying the upper portion of the column 11 in such manner that the screw 15 extends upwardly into the interior of the forward part 11a of the column. Engaged with the screw 15 is a cooperating rotatable nut 16 mounted in thrust bearings in the column and co-acting with the screw to raise or lower the head upon being rotated in the one or the other direction.

Figure 4:
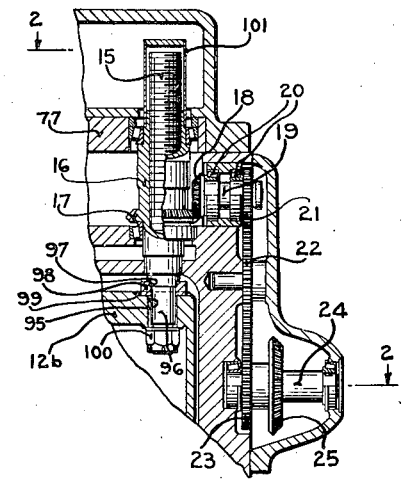
Fig. 4 is a fragmentary view in vertical section taken substantially on the plane represented by the line 4—4 in Fig. 2 and showing the head elevating mechanism.

A bevel gear 17 is provided on and secured to the lower end of the nut 16, as shown in Fig. 4, in position to mesh with a bevel pinion 18 fixed on a stub shaft 19 that is rotatably mounted in bearings 20 in the side of the column 11. At its outer end, the shaft 19 is provided with a spur pinion 21 that meshes with an idler gear 22, rotatably mounted on the side of the column and arranged to be driven by a pinion 23 on a shaft 24. The shaft 24 is provided with a bevel gear 25 that may be turned by a bevel pinion 26 (Fig. 2) on a forwardly extending horizontal shaft 27 which is provided with a handwheel 28 at its forward end for manually rotating the gear train to raise or lower the sliding head 12 to any desired position within its range of movement.

Power for rotating the tool spindle 13 is derived from a power source in the column of the machine and is transmitted to the spindle 13 by means of a speed-changing transmission apparatus partly shown in Fig. 1 and including two rate changing mechanisms, a primary rate changer 29 mounted in the column and a secondary rate changer 30 mounted in and bodily movable with the sliding head 12.

The two rate changers 29 and 30 are arranged in series relationship in the transmission mechanism, the secondary rate changer 30 constituting in effect a range changing device adapted to cause the spindle to operate in either a high speed range or a low speed range, the advantage of having the range changer mounted in the sliding head being that at low speeds only the spindle and its low range gear are operated at low speed and subjected to high driving torque.

The primary rate changer 29 of the speed-changing mechanism is represented in Fig. 1 by a sliding gear couplet 32 and a sliding gear 33, both splined on a horizontal shaft 34 to be movable thereon in well-known manner for selectively engaging cooperating driving gears (not shown) arranged to transmit power from the power source to the shaft 34 at a selected one of several available speeds that constitute a series of spindle speeds arranged in steps differing by relatively small amounts. The shaft 34 is provided at its forward end with a bevel pinion 35 that meshes with a similar cooperating bevel pinion 36 on the lower end of a vertically disposed drive shaft 37 extending into the upper part of the column 11. The drive shaft 37 is provided at its upper end with a spur gear 38 that meshes with a horizontally disposed idler gear 39 arranged to drive a meshing gear 40, the three gears constituting a transmission train extending into the forwardly projecting portion 11a of the column to a position above the underlying part 12b of the sliding head 12.

The gear 40 in the upper forward end 11a of the column is provided with an internally splined hub, as may be seen in Fig. 2, and power is transmitted from it to the sliding head 12 by means of a vertically disposed splined shaft 41 that is journalled in the gear compartment 12b of the sliding head in manner to slide vertically therewith, and is arranged to have sliding splined driving connection with the gear 40 to permit of relative vertical movement. At its lower end within the gear-carrying portion of the sliding head, the shaft 41 has splined connection with a shiftable gear couplet 42 that is constituted by a relatively small pinion 43 and a relatively large gear wheel 44 joined rigidly together.

The couplet 42 forms part of the secondary rate changer 30 that constitutes the portion of the speed-changing gear mechanism which is mounted within the sliding head 12 and is movable bodily therewith. As shown in Fig. 1, the large gear wheel 44 of the couplet 42 is adapted to be meshed with a relatively small gear wheel 45 secured on the tool spindle 13 when the couplet is in its lower position, and the pinion 43 of the couplet is adapted to be raised into meshing engagement with a relatively large gear wheel 46 secured on the spindle 13 above and in spaced relation with the small gear wheel 45. This secondary rate change gearing 30 is so proportioned as to change the spindle speed in relatively large steps to effect operation of the spindle 13 selectively in either a fast speed range or a slow speed range, the arrangement being such that each of the two speed ranges thus effected includes all of the several speeds that may be effected by the primary rate changer 29 of the gear-shifting mechanism.

For shifting the movable gear couplet 42 in the sliding head 12 to either of its two positions to selectively engage either the gear wheel 44 or the pinion 43 with its complementary gear wheel on the spindle 13, there is provided shifting means including a vertically extending shifting rod 50 having a bifurcated shifting fork 51 that engages both sides of the gear wheel 44. The shifting rod 50 is slidably mounted for vertical movement in the underlying portion 12b of the sliding head 12 and extends upwardly therefrom into the interior of the hollow forwardly projecting upper portion 11a of the column 11. At its upper end within the column, the shifting rod 50 is operatively connected to gear shifting mechanism arranged to shift both the primary rate changer 29 and the secondary rate changer 30 in coordinated manner to effect a complete series of spindle speeds in consecutive sequence.

As shown in Figs. 1, 2 and 5, the upper end of the rod 50 is operatively connected to the forward end of a pivotally mounted gear shifting lever or actuating arm 55 constituting part of a self-compensating linkage mechanism. The lever 55 is pivotally connected at its other end, inwardly of the column, to the upper end of a shifting link 58 in such manner that when the link 58 is moved vertically the gear shifting lever 55 will be pivoted about its pivotal mounting, resulting in the shifting rod 50 being moved vertically in direction opposite to that in which the link 58 is moved. The link 58 is pivotally connected at its lower end to a bracket 59 fixed on a vertically slidable control rod 60 disposed adjacent to and substantially parallel with the drive shaft 37.

The control rod 60 is associated at its lower end with actuating means such as hydraulically actuated shifting apparatus of the type more fully set forth in my co-pending application, Serial No. 146,581, filed June 5, 1937, now Patent No. 2,240,973 dated may 6, 1941 and that is arranged to move the rod 60 up or down to either one of two positions to correspondingly move the gear couplet 42. As shown in my co-pending application, the hydraulic shifting apparatus is controlled by mechanism which also controls shifting of the primary rate changer 29.

In order that the gear-shifting mechanism may actuate the shiftable gear couplet 42 in the sliding head 12 in the same manner regardless of the position of the sliding head relative to the column, the shifting mechanism is provided with a compensating or equalizing apparatus including kinematic linkage that embodies the principles of the present invention. The equalizing apparatus includes a movable fulcrum element or pivotal support for the shifting lever 55, the arrangement being such that the fulcrum is moved by the sliding head 12 in manner to so move the shifting lever 55 as to maintain a constant relationship between the shifting apparatus and the movable gear couplet 42 in the sliding head for any position to which the head may be moved.

As may be seen by referring to Figs. 1, 2 and 5, the gear shifting lever 55 is pivotally mounted near its mid-length upon a movable pivot or center 72. The pivot 72 constitutes in effect a movable fulcrum element pivotally supporting the gear shifting lever 55, and it is so arranged as to move in accordance with the movement of the sliding head 12 in manner to maintain the forward end of the gear-shifting lever and the shifting rod 50 in the same relation to the sliding head regardless of the position assumed by the sliding head relative to the column.

To effect this desired movement of the fulcrum for the actuating arm or lever 55, the movable pivot 72 is carried by an equalizing or compensating arm or lever 73 that is pivotally mounted in the column 11 upon a stationary pivot 74 at its inner end and is operatively connected at its forward end to the sliding head 12. As may be seen in Figs. 1, 3, and 5, the forward end of the equalizing lever 73 is operatively connected to a vertically disposed compensating rod 75 that is rigidly attached to the sliding head 12 and is disposed to slide vertically within the upper part 11a of the column, the arrangement being such that the forward end of the equalizing lever 73 is moved in accordance with the vertical movement of the sliding head 12. In the particular arrangement of parts here illustrated, the movable pivot 72 is carried by the equalizing lever 73 at a position substantially midway between its ends, and both the equalizing lever 73 and the gear shifting lever 55 are so proportioned that the ratio of the lever arm at the left of the fulcrum or pivot 72 to the lever arm at the right of the fulcrum 72 is substantially the same in both levers.

When the sliding head 12 is moved vertically relative to the column, the equalizing lever 73 pivots about the stationary pivot point 74 and the shifting lever 55 moves with it, pivoting about the upper end of the shifting link 58 acting as a substantially stationary pivot point, and as the ratios of the lever arms at each side of the movable fulcrum 72 are substantially equal, the forward end of the gear shifting lever 55 will move vertically through a distance substantially equal to the vertical distance through which the forward end of the equalizing lever 73 is moved, thereby remaining in substantially constant relationship with the speed changing gearing in the sliding head. Consequently the gear shifting rod 50 will be moved vertically coincidentally with vertical movement of the compensating rod 75, and the gear couplet 42 will remain in its predetermined operating position relative to the gear wheels 45 and 46 on the spindle 13 in any position to which the head 12 may be moved. Likewise, shifting movement of the gear couplet 42 relative to the cooperating gears on the spindle takes place in the same manner, regardless of the position of the sliding head 12. For example, upon moving the shifting link 58 from its upper position, as shown in Figs. 1 and 5, to its lower position, which results in rocking the shifting lever 55 counterclockwise and in lifting the shifting rod 50, the gear couplet 42 will be moved from its lower position to its upper position within the sliding head 12, whatever the position of the head may be at the time.

In Fig. 5, the gear shifting mechanism is shown diagrammatically in four different positions to better illustrate the action of the compensating apparatus. In this figure, the apparatus is shown in full lines in the relation assumed by its parts with the sliding head in its extreme lower position and with the gear couplet 42 in its lower position or high speed range position. In shifting the gear couplet 42 to its upper position or low speed range position, the shifting link 58 is moved downward by the shifting mechanism thereby raising the forward end of the shifting lever 55 and placing it in the upper, substantially horizontal, position indicated in dot-dash lines in Fig. 5.

The relationship assumed by the mechanism when the sliding head 12 is moved to its extreme upper position is shown in dotted lines in Fig. 5, the equalizing lever 73 being shown pivoted upward at its forward end about the stationary pivot 74. With the equalizing lever in this position, the gear shifting lever assumes the substantially horizontal position shown in dotted lines when the gear couplet 42 is in its lower or high speed position, and it takes the position shown in double dot-dash lines when the gear couplet is moved to its upper or low speed position. Although Fig. 5 shows the positions of the linkage at only the two extreme positions of the sliding head 12 relative to the column 11, it will be understood that the shifting action of the compensated gear shifting lever 55 will be the same for any intermediate position of the sliding head, and that movement of the sliding head from any one position to any other position does not change the position of the gear couplet 42 relative to the gears 45 and 46 in the head.

Figure 3:
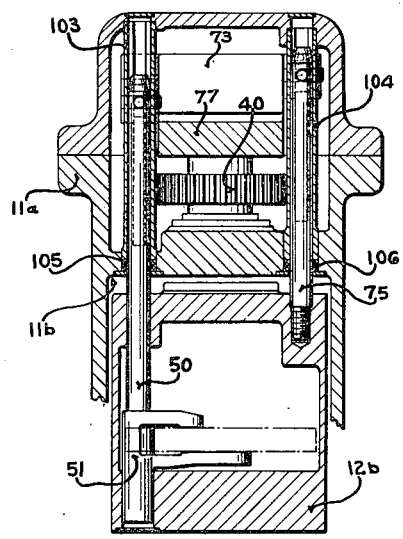
Fig. 3 is a view of the upper part of the machine in vertical section taken substantially on the planes represented by the line 3—3 in Fig. 2.

As may best be seen in the top plan view, Fig. 2, the equalizing lever 73 is of generally U-shape with spaced depending lugs 76 at its closed end, which is disposed inwardly of the column. The lugs 76 are disposed respectively at the opposite sides of a horizontal supporting member or bearing plate 77 constituting a stationary part fixed to the column 11 of the machine by screws 77a, and a pivot pin extends through both lugs and the plate to constitute the stationary pivot 74. One of the arms of the U-shaped lever 73, the one at the right side of the machine as shown in Figs. 2 and 3, is extended forward to connect with the equalizing rod 75 which is disposed at the right of the spindle driving gears 39 and 40. As shown in Figs. 1 and 5, the extended arm of the lever 73 is provided with a pin 78 at its forward end that engages a slot 79 in a block 80 secured to the upper end of the equalizing rod 75.

The gear shifting lever 55 is also of generally U-shape and is disposed to encompass it or lie outside of the equalizing lever 73 in nested relationship with it, as shown in Fig. 2, the two levers being connected together at each side of the plate 77 midway of their lengths by aligned pins constituting the movable fulcrum or pivot point 72. As in the case of the equalizing lever 73, only one arm of the shifting lever 55 is extended forward, the one at the left side of the machine as shown in Figs. 2 and 3, and it is connected to the shifting rod 50 which is disposed at the left of the gears 39 and 40. The extended arm of the lever 55 is provided with a pin 81 at its forward end that engages a slot 82 in a block 83 secured to the upper end of the gear shifting rod 50. At its other end, inwardly of the column, the shifting lever 55 is provided with lugs 84 disposed at the right side of the machine and that receive a pivot pin 85 which also passes through the upper end of the shifting link 58 to form a pivotal connection therewith.

The shifting link 58 is actuated to shift the gear couplet 42 by mechanism including the bracket 59 and the control rod 60, the rod being provided at its lower end with a yoke member 86 having a horizontal groove cooperating with a sliding block 87. As shown in Figs. 1 and 5, the sliding block 87 is pivotally mounted eccentrically on an actuating wheel or disk 88 so supported that rotation thereof causes the sliding block to co-act with the groove in the yoke in manner to effect vertical movement of the rod 60. For rotating the wheel 88 to move the rod 60 and shift the gear couplet, there is provided a pinion 89 that is operatively connected to the wheel and that meshes with rack teeth on a horizontally disposed piston rod 90 which is connected to a piston 91 operating within a cylinder 92 and constituting the hydraulically actuated shifting apparatus. The cylinder 92 is provided with fluid pressure connections 93 and 94 through which pressure may be admitted to move the piston 91 either to the right end or to the left end of the cylinder, the fluid pressure connections 93 and 94 being associated with the controlling mechanism that also functions to shift the gear couplet 32 and the sliding gear 33 as well as other shiftable gearing within the column 11, as is more fully set forth in my previously mentioned co-pending application.

Movement of the piston 91 from one end of the cylinder 92 to the other end thereof causes the pinion 89 and the actuating wheel 88 to turn through one-half revolution in manner to move the sliding block 87 from one extreme position to its other extreme position as shown in dotted lines in Fig. 5. Movement of the sliding block 87 and the associated rod 60 from one extreme position to the other results in shifting the gear couplet 42 in the sliding head 12 from one to the other of its two positions, as previously explained. Fluid pressure for actuating the piston 91 under the control of the gear controlling mechanism is obtained from a source such as the main lubricating pump (not shown) that is normally mounted in the column of the machine and is continuously driven in the usual manner.

In order that the gear couplet 42 may be retained in its upper operating position independently of fluid pressure acting upon the piston 91, the shifting mechanism is arranged to be self-locking. As may be seen in Fig. 5, when the couplet is moved to its upper position by moving the control rod 60 to its lower position, the sliding block 87 on the wheel 88 is turned clockwise past a vertical plane through the center of the wheel, to the position shown in dot-dash lines. With the block 87 in this position, force exerted upward upon the rod 60 in sustaining the weight of the gear couplet 42 tends to turn the wheel 88 clockwise, but movement of the wheel 88 in this direction is definitely limited by reason of the fact that the piston 91 abuts the head of the cylinder 92. This arrangement effectively locks the shifting mechanism to retain the gear couplet in its upper position until such time as fluid pressure is applied to the left end of the piston 91 through the connection 93 to turn the wheel 88 counterclockwise.

In order to provide for aligning the feed screw 15 (Fig. 4) accurately with the elevating nut 16 rotatably mounted in the column, the screw 15 is provided with an adjustable connection best shown in the enlarged views Figs. 6 and 7. To permit slight lateral adjustment of the screw relative to the head 12, a bore 95 slightly larger in diameter than the lower end of the screw 15 is provided in the head 12 to receive a reduced shank portion 96 of the screw. As shown in Fig. 6, the portion of the screw 15 just above the shank 96 is provided with flattened sides in manner to fit in a rectangular groove 97 in the top of a centering washer 98, whereby the screw may move laterally relative to the washer along one line of action. The washer 98 is provided on its lower surface with flattened sides disposed at right angles to the groove 97 and fitting within a groove 99 in the upper surface of the head 12, to constitute a tongue and groove coupling whereby the screw and the washer may move laterally as a unit relative to the head along a line at right angles to the line of movement of the screw relative to the washer. By this arrangement, the screw is free to move laterally in any direction within the bore 95 in finding its aligned position when assembling the machine but is restrained from rotating relative to the head 12.

In assembling the parts, the screw 15 is first threaded into the nut 16 in the column, as shown in Fig. 4, and then the head 12 is fitted into the ways 14 and moved upward to pass the shank 96 of the screw through the washer 98 and through the bore 95 in the head, the centering slots permitting the screw to assume its aligned position within the bore 95. A nut 100 is then threaded onto the lower end of the screw shank 96 and tightened to rigidly connect the screw to the head 12 in accurately aligned relationship with the line of movement of the head along the ways 14.

To prevent leakage of lubricating oil from occurring between the screw 15 and the nut 16, a tubular guard 101 closed at its upper end is fitted over the upper end of the screw to shield it from oil that is thrown about by the rotating gears and shafts and that might otherwise run down the screw 15 and leak out of the machine. A similar tubular guard or cup 102 is fitted over the upper end of the splined driving shaft 41, as shown in Fig. 1. The shifting rod 50 and the compensating rod 75 are both likewise protected in similar manner by tubular guards 103 and 104 respectively, shown in Figs. 1, 2 and 3. The tubular guards 103 and 104 extend entirely to the top of the column and are each provided with a longitudinal slot extending vertically along the rearward side thereof to accommodate vertical movement of the blocks 83 and 80 which connect the rods with their respective cooperating levers. Packing glands 105 and 106 are provided at the lower ends of the tubes 103 and 104 to prevent leakage of oil which may enter the slots.

Although a specific machine has been described in some detail in order to clearly disclose mechanism exemplifying a preferred embodiment of the invention, it is to be understood that the apparatus herein set forth is susceptible of various modifications apparent to those skilled in the art without departing from the spirit and scope of the invention as defined in the subjoined claims.

The invention is hereby claimed as follows:

1. In a milling machine of the vertical spindle type, the combination with a column and a spindle supporting head slidably mounted on said column, of a spindle rotatably mounted in said head, speed changing gearing carried by said sliding head and operatively connected to drive said spindle, actuating means mounted on said column independently of said head for shifting said speed changing gearing, shifting means connecting said actuating means on said column with said speed changing gearing carried by said sliding head including an actuating arm and a movable fulcrum element pivotally supporting said arm, and means arranged to move said fulcrum element in accordance with the movements of said sliding head in manner to maintain said arm in substantially constant relation with said speed changing gearing at any position of said head.

2. In a milling machine of the vertical spindle type, the combination with a column and a spindle supporting head slidably mounted on said column, of a spindle rotatably mounted in said head, speed changing gearing carried by said sliding head and operatively connected to drive said spindle, means mounted on said column independently of said head for shifting said speed changing gearing, and means operatively connecting said shifting means with said speed changing gearing including an actuating arm and a compensating arm pivotally supporting said actuating arm, said compensating arm being so pivoted and connected with said sliding head as to maintain said actuating arm in substantially constant relation with said speed changing gearing at any position of said head.

3. In a milling machine of the vertical spindle type, the combination with a column and a spindle supporting head slidably mounted on said column, of a spindle rotatably mounted in said head, speed changing gearing carried by said sliding head and operatively connected to drive said spindle, means mounted on said column for shifting said speed changing gearing, means connecting said shifting means with said speed changing gearing including an actuating arm connected at one end to said shifting means and at its other end to said shiftable speed change gearing, a compensating arm pivotally supported at one end on said column and connected at its other end to move with said sliding head, and means pivotally supporting said actuating arm on said compensating arm in such manner that the end of said actuating arm connected to said shiftable gearing remains in substantially constant relation thereto when said sliding head is moved relative to said column.

4. In a milling machine of the vertical spindle type, the combination with a column, a head slidably mounted thereon, and a spindle rotatably supported in said head, of shiftable gearing carried by said head and connected to drive said spindle, a gear shifting arm disposed with one end operatively connected to shift said gearing, actuating means mounted on said column and engaging the other end of said shifting arm for actuating it to shift said gearing, and means pivotally supporting said shifting arm in such manner that its operative relation with said actuating means and said shiftable gearing is not disturbed by sliding movement of said head relative to said column.

5. In a milling machine of the vertical-spindle sliding-head type having shiftable gearing carried by the sliding head, the combination with actuating means on a stationary part of the machine for shifting said gearing, of link mechanism pivotally connecting said actuating means to said shiftable gearing in manner to effect shifting thereof, said link mechanism being so arranged that sliding movement of said head does not affect the relation of said shifting means to said gearing.

6. In a milling machine of the vertical-spindle sliding-head type having shiftable gearing carried by the sliding head, the combination with actuating means on a stationary part of the machine for shifting said gearing, of link mechanism pivotally connecting said actuating means to said shiftable gearing for shifting it, said link mechanism being so arranged as to compensate for sliding movement of said head.

7. In a milling machine having relatively bodily movable supports, the combination of a transmission mechanism including a rate changer providing serially arranged gearing shiftable to a variety of position combinations collectively productive of a high rate, a relatively low rate and a variety of intermediate rates, different shiftable portions of said gearing being arranged in different of said supports for relative bodily movement with the supports, gear shifting actuating mechanism carried by one of said supports, and mechanical linkage pivotally mounted on said supports and connecting said shifting mechanism to the shiftable gearing portion in a relatively movable support, said connecting linkage being adapted automatically to compensate for relative movement of said supports, whereby to maintain a selected position of said shiftable gearing regardless of said relative movement of said supports.

8. In a milling machine, the combination with an upstanding hollow column, a hollow carrier slidably guided on said column for vertical movement relative thereto, and a vertically disposed tool spindle rotatably mounted in said carrier; of a spindle rate changer including a shiftable rate change portion housed within said hollow carrier, control means for said rate changer housed within said hollow column, and motion transmitting mechanical linkage pivotally supported by said movable carrier and operatively connecting said control means in said column to said rate change portion in said movable carrier in manner to maintain the relationship between said control means and said rate changer substantially constant regardless of the position of said carrier relative to said column.

9. In a milling machine of the vertical spindle type, a column, a sliding head mounted for vertical movement on said column, an equalizing lever pivotally mounted on said column and operatively connected at one end to said sliding head for pivotal movement in accordance with the vertical movement of said head, a vertically disposed tool spindle rotatably mounted in said sliding head for vertical movement therewith, driving mechanism for said spindle including shiftable gearing carried by said sliding head, and a gear shifting lever operatively connected at one end to shift said gearing and pivotally mounted upon said equalizing lever in such manner that with the other end of the shifting lever held substantially stationary in the column, the shiftable gearing within said head will remain in the same relative position regardless of the position of the head in its path of vertical movement.

10. A compensating mechanism for gear shifting apparatus of the type in which the gears to be shifted are carried by a member movable relative to the member from which the shifting action takes place, comprising an equalizing lever pivotally connected to each of said relatively movable members, and a shifting lever pivotally mounted on said equalizing lever and operatively connected to shift said gearing, the proportions of said levers being such that relative movement of said relatively movable members does not affect the operative relationship of said shiftable gears nor the operative relationship of said shifting lever to the member from which shifting action takes place.

11. In a machine tool, the combination with relatively movable machine parts, of a variable speed transmission mechanism including shifting elements carried by more than one of said relatively movable parts and connected for operation in series relation, of actuating means mounted on one of said machine parts and operative to shift said shiftable elements of said transmission mechanism, shifting means operated by said actuating means including an actuating arm and a movable fulcrum element pivotally supporting said arm for shifting certain of said elements carried by a relatively movable part of said machine, and a connection arranged to move said fulcrum element in accordance with relative movement of said machine parts in manner to maintain said pivoted actuating arm in substantially constant relation to the shiftable elements actuated thereby.

12. In a machine tool, the combination with a supporting member and a tool carrying member slidably mounted on said supporting member, of shiftable gearing mounted in said tool carrying member, gear controlling apparatus mounted on said supporting member, a gear shifting lever operatively connecting said controlling apparatus with said shiftable gearing, an equalizing fulcum element pivotally supporting said shifting lever, means arranged to move said equalizing fulcrum element in accordance with sliding movement of said tool carrier and in manner to so move said shifting lever as to maintain said shiftable gearing in the position selected by said gear controlling apparatus on said supporting member in any position of said slidable tool carrier, and means on said supporting member to lock said controlling apparatus to prevent accidental movement of said shiftable gearing.

13. In a machine tool, the combination with a supporting member and a tool carrying member slidably mounted on said supporting member, of shiftable gearing mounted in said tool carrying member, gear controlling apparatus mounted on said supporting member, gear shifting means operatively connecting said controlling apparatus with said shiftable gearing, and an equalizing lever pivotally connected to both said supporting member and said tool carrying member and arranged to support said gear shifting means to move it in accordance with sliding movement of said tool carrier in manner to maintain said shiftable gearing in the position selected by said gear controlling apparatus on said supporting member regardless of the position assumed by said slidable tool carrier.

14. In a milling machine of the vertical spindle type having a supporting column and a sliding head, the combination with a transmission mechanism including primary shiftable gearing mounted in said column and secondary shiftable gearing carried by said sliding head, said gearing being connected in series relationship, of mechanism for shifting said gearing in predetermined sequence to effect a series of spindle speeds, said mechanism including actuating means mounted in said column and operative to shift said gearing mounted therein and other actuating means mounted in said column and operative to shift said gearing carried by said sliding head, and shifting means including kinematic linkage arranged to pivotally connect said latter actuating means with said gearing carried by said sliding head to effect shifting of said gearing in predetermined manner regardless of the position of said sliding head.

15. In a milling machine of the vertical spindle type having a column and a spindle carrying head slidably mounted on said column, the combination with a tool spindle rotatably mounted in said head and driving mechanism for said spindle including a rate changer carried by said sliding head in manner to move bodily therewith, of shifting mechanism for said rate changer comprising an actuating mechanism mounted in said column, and linkage operatively connecting said actuating mechanism in the column to said rate changer in the sliding head, said linkage including a pivotally mounted lever, and a movable element arranged to pivotally support said lever, said movable element being operatively connected to said sliding head for movement thereby in manner to so position said pivoted lever that the adjustment of said rate changer is not affected by movement of said sliding head.

16. In a milling machine of the vertical spindle type, the combination with a column and a spindle supporting head slidably mounted on said column, of means for moving said slidably mounted head relative to said column including a threaded nut rotatably mounted in said column, a complementary threaded elevating screw disposed in cooperating relationship with said threaded nut, and means connecting said threaded elevating screw to said slidably mounted head, said connecting means including a coupling having tongue and groove elements arranged to prevent rotation of said screw relative to said head when said nut is rotated and to permit lateral adjustment of said screw relative to said head to align said screw with the path of movement of said sliding head.

17. In a milling machine of the vertical spindle type having a column and a spindle carrying head slidably mounted on said column, the combination with a tool spindle rotatably mounted in said head and driving mechanism for said spindle including a rate changer carried by said sliding head in manner to move bodily therewith, of shifting mechanism for said rate changer comprising an actuating mechanism mounted in said column, linkage including a sliding rod operatively connecting said actuating mechanism in the column to said rate changer in the sliding head, and means for shielding said sliding rod from contact with splashing oil in said column including a tubular guard enclosing the part of said rod extending within said column, said guard having a longitudinal slot for receiving a connecting element of said linkage.

18. In a milling machine of the vertical spindle type having a column and a spindle carrying head slidably mounted on said column, the combination with a tool spindle rotatably mounted in said head and driving mechanism for said spindle including a rate changer carried by said sliding head in manner to move bodily therewith, of shifting mechanism for said rate changer comprising an actuating mechanism mounted in said column, and linkage operatively connecting said actuating mechanism in the column to said rate changer in the sliding head, said linkage including a fulcrum element movably mounted in said column and a lever pivotally supported on said fulcrum element, said lever being connected at one end to said actuating mechanism and at the other end to said rate changer, and said movable fulcrum being operatively connected to said sliding head for movement thereby in manner to so move said lever as to maintain the rate changer end thereof in constant relationship with said rate changer.

19. In a milling machine of the vertical-spindle sliding-head type having a column with a spindle carrying head slidably mounted thereon and a tool spindle rotatably mounted in said head, the combination with driving mechanism for said spindle including a rate changer having a movable element carried by said sliding head in manner to be bodily movable therewith, of mechanism for adjusting said rate changer, comprising an actuating mechanism mounted in said column for moving said movable element of said rate changer, locking means associated with said actuating mechanism and operative to lock said element in adjusted position, linkage operatively connecting said actuating mechanism in the column to said movable rate changer element in the slidable head, said linkage including a pivotally mounted element moving lever, a movable supporting member pivotally mounted in said column and pivotally supporting said lever in manner to constitute a movable fulcrum for said lever, and means operatively connecting said pivoted supporting member to said slidable head for movement therewith, the arrangement being such that movement of said supporting fulcrum by said slidable head results in moving said pivoted lever in manner to maintain the adjusted position of said rate changer element regardless of the movement of said slidable head relative to said column.

20. In a machine tool, the combination with a frame and a member slidably mounted on said frame, of adjustable mechanism carried by said slidable member, apparatus mounted on said frame and operative to control said mechanism, linkage operatively connecting said controlling apparatus with said adjustable mechanism, and an equalizing lever pivotally connected to both said frame and said slidably mounted member and arranged to support said linkage in manner to move it in accordance with sliding movement of said member to maintain said adjustable mechanism in the position established by said control apparatus on said frame regardless of the position of said slidable member relative to said frame.

21. In a machine tool having a base and a support member movably mounted on said base, the combination with a movable element carried by said movable support member, of mechanism for moving said element comprising an actuating device mounted on said base independently of said movable element, and linkage operatively connecting said actuating device on said base to said movable element on said movably mounted support member, said linkage including a fulcrum element movably mounted on said base and a lever pivotally supported by said fulcrum element, said lever being connected at one end to said actuating device and at its other end to said movable element, and said movable fulcrum element being operatively connected to said movably mounted support member for movement thereby in manner to so move said lever as to maintain the end thereof connected to said movable element in constant relationship with said movable support member.

22. In a machine tool provided with a frame and a member movably mounted on said frame, the combination with adjustable mechanism carried by said movable member, of an actuating device mounted on said frame for adjusting said mechanism in said movable member, a pivotally supported lever disposed to connect said actuating device with said adjustable mechanism for operating it, means to pivotally support said lever, and means to move said pivotal support in accordance with movement of said movable member in a manner to maintain said adjustable mechanism in the position established by said actuating device on said frame regardless of the position assumed by said movable member relative to said frame.

23. A compensating mechanism for a member shifting apparatus of the type in which the members to be shifted are carried by a support movable relative to a support from which the shifting action takes place, comprising a movable fulcrum element, a shifting lever pivotally mounted on said movable fulcrum element and operatively connected to shift said member, and means to move said fulcrum element in synchronism with the movement of said movable support in such manner that relative movement of said supports does not affect the operative relationship of said shifting lever to said shiftable member or to the support from which shifting action takes place.

24. In a machine tool of the type having a stationary part and a relatively movable support, the combination with shiftable gearing carried by and movable bodily with said movable support, of actuating means on said stationary part for shifting said gearing, and link mechanism pivotally connecting said actuating means to said shiftable gearing for shifting it, said link mechanism being connected to both said stationary part and said movable support in manner to compensate for movement of said movable support relative to said stationary part.

25. A compensating mechanism for shifting adjustable apparatus of the type in which the apparatus to be shifted is carried by a supporting member movable relative to the member from which the shifting action takes place, comprising an equalizing lever pivotally connected to each of said relatively movable members, and a shifting lever pivotally mounted on said equalizing lever and operatively connected to shift said apparatus, the proportions of said levers being such that said members may be moved relatively without affecting the operative relationship of said shiftable apparatus to the member carrying it nor the operative relationship of said shifting lever to the member from which said shifting action takes place.

26. In a machine tool, the combination with relatively movable machine parts, and a variable speed transmission mechanism including two shiftable rate changing elements carried respectively by two of said relatively movable parts and operatively connected in series relationship, of controlling apparatus mounted on one of said machine parts and operative to shift the shiftable rate changing elements carried by said part, shifting means disposed to be operated by said controlling apparatus and functioning to shift the shiftable rate changing element carried by the other of said relatively movable machine parts, and an equalizing lever pivotally connected to each of said relatively movable parts and arranged to support said shifting means in manner to move it in accordance with the relative movement of said parts for maintaining said shiftable rate changers in the positions selected by said controlling apparatus regardless of the relative position of said machine parts.

27. In a machine tool having slidably connected relatively movable members, means for moving said slidable members relative to each other including a rotatably mounted threaded nut carried by one of said members and a complementary threaded screw carried by the other of said members in cooperating relationship with said threaded nut, and means connecting said threaded screw to the member carrying it, including a coupling having tongue and groove elements arranged to prevent rotation of said screw relative to said member when said nut is rotated and adapted to permit lateral adjustment of said screw relative to said member to align said screw with the path of sliding movement of said member.

28. In a machine tool having a hollow frame constituting a lubricating chamber and a member movable relative to said frame, the combination with mechanism operatively connecting actuating means in said frame with apparatus in said movable member including a rod extending from said member into said frame, of means for shielding said rod from contact with splashing oil in said frame including a tubular guard enclosing the part of said rod extending within said frame, said tubular guard having a longitudinal slot for receiving a connecting element of said mechanism.

29. A control mechanism adapted for operation from one part of a machine to effect control of apparatus on a relatively movable part of said machine, comprising a controller actuating power source carried by one part of a machine, a pivotally mounted control lever operatively connecting said controller actuating power source with apparatus on a relatively movable part of said machine, and means movable by said movable machine part and arranged to pivotally support said control lever in manner to maintain it in predetermined operative relationship with said controller actuating power source and with said apparatus regardless of relative movement of said machine parts.

JOSEPH B. ARMITAGE.